July 28, 1953 R. G. WALTON 2,646,681
AUTOMATIC TEMPERATURE INDICATING SYSTEM
Filed April 18, 1950 2 Sheets-Sheet 1

Inventor: Richard G. Walton
By [signature]
His Attorney

July 28, 1953   R. G. WALTON   2,646,681
AUTOMATIC TEMPERATURE INDICATING SYSTEM
Filed April 18, 1950   2 Sheets-Sheet 2

Inventor: Richard G. Walton
By
His Attorney

Patented July 28, 1953

2,646,681

UNITED STATES PATENT OFFICE 2,646,681

AUTOMATIC TEMPERATURE INDICATING SYSTEM

Richard G. Walton, Houston, Tex., assignor to Shell Development Company, San Francisco, Calif., a corporation of Delaware Application April 18, 1950, Serial No. 156,589

3 Claims. (Cl. 73—341)

This invention relates to the control of temperature within a reaction vessel and pertains more particularly to a method and apparatus for automatically determining and controlling the temperature of a shifting reaction zone within a closed reaction or regeneration vessel.

For example, in the regeneration of a fixed bed of catalyst, and in many exothermic chemical reactions carried out in a catalyst-filled vessel, the reaction generally takes place at a high temperature in a relatively small zone, or portion thereof, of the catalyst bed, said reaction zone being transient in nature. Thus, for example, when a contaminated bed of catalyst in a vessel is regenerated by flowing air into the top of the vessel and withdrawing gases from the bottom thereof, the "hot spot" or "flame front" within the vessel is first located at the top of the catalyst bed and is later moved slowly downward through the bed as the upper portion of the bed becomes purified or regenerated.

It is essential that the highest temperature within a catalyst regeneration vessel be determined and controlled in order to obviate the deleterious effect that excessively high temperatures have on certain catalysts. For example, excessive heat may causes certain impurities present in the catalyst bed to become fused and coat the catalyst particles so as to reduce the effective contact area of each particle by as much as 80 per cent.

At present, the movement of a flame front within a fixed catalyst bed may be followed by employing a number of stationary thermocouples inserted at various levels in the bed. This method is generally impractical because, when the flame front is sharply defined, fifty or more closely spaced thermocouples may be required to follow a regeneration reaction with adequate precision. In the regeneration of catalyst in experimental scale units, movement of the flame front is normally followed by manually varying the position of a thermocouple. This method of trial and error probing to locate the moving hot spot is also impractical as it requires the continuous attention of an operator for periods as long as sixteen hours.

It is therefore a primary object of the present invention to provide a method and apparatus for automatically determining and indicating the position of a shifting zone of maximum temperature within a reaction vessel.

Another object of the present invention is to provide a method and apparatus for maintaining the optimum temperature of a shifting reaction zone within a reaction vessel at a constant predetermined value.

A further object of this invention is to provide a temperature-sensing device adapted to follow automatically a shifting zone of maximum reaction temperature of any non-isothermal, fixed-bed catalytic process, or any other process or system involving a temperature gradient wherein the maximum temperature is the important factor.

Another object of this invention is to provide apparatus for automatically controlling the addition of one temperature-modifying material to a shifting reaction zone whereby the optimum temperature of said reaction may be maintained at a constant value.

Additional objects and advantages will become more apparent from a study of the following detailed description when considered in conjunction with the accompanying drawing, wherein.

Figure 1:
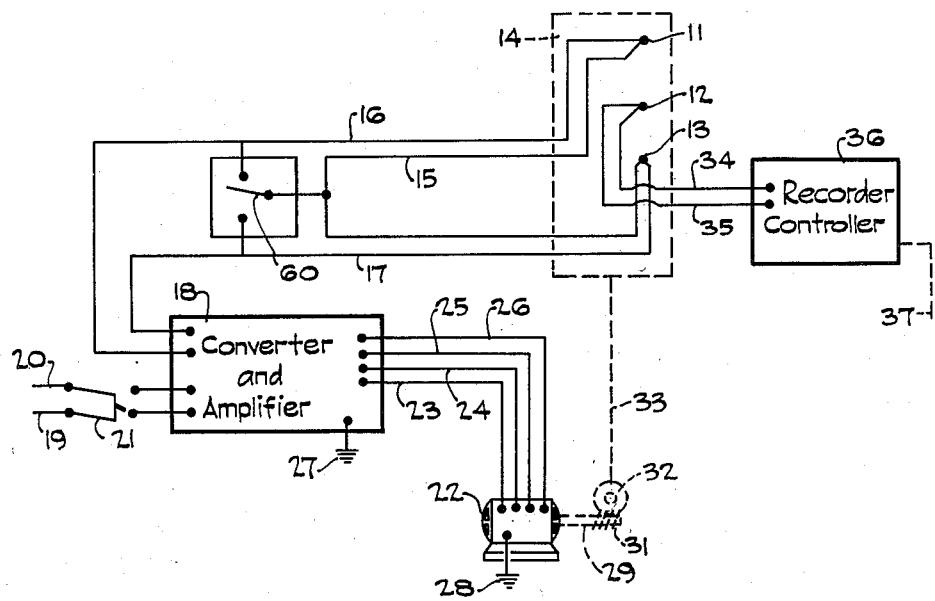
Figure 1 is a schematic view of an automatically movable temperature-sensing and indicating system according to the present invention.
Figure 6:
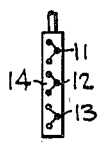
Figures 6, 7 and 8 are three embodiments of thermocouple groupings adapted for movement in one-, two- and three-dimensional systems, respectively.

Referring to Figures 1 and 6 of the drawing, the present apparatus comprises three temperature sensing elements 11, 12 and 13 fixedly mounted in approximately equally spaced rectilinear relationship to each other on a suitable carrier or housing 14. The housing or block 14 may be of any shape or size, such, for example, as a rectangular block or a cylindrical or tubular member, but is preferably of a size adapted to pass through a thermocouple well 30 of Figure 2.

In the following description, the sensing elements 11, 12 and 13 are referred to as thermocouples. It is understood, however, that the principle of the present invention is also applicable to the use of resistance thermometers, radiation pyrometers and similar types of temperature measuring devices.

The outer or terminal thermocouples 11 and 13 are connected in series opposition by lead 15 so as to respond to temperature differentials. Leads 16 and 17 in turn connect the thermocouples 11 and 13 to a converter and amplifier unit 18, for example, such as is used in a Brown Instrument Company electronic continuous balance potentiometer (described in their Bulletin No. B15-10).

The converter and amplifier unit 18 is connected to a source of alternating current by leads 19 and 20 having a main switch 21 therein. The converter-amplifier 18 is connected to a reversible motor 22 by leads 23, 24, 25 and 26 and is grounded at 27, the motor being grounded at 28.

The shaft 29 of the motor 22 is operatively connected to the thermocouple base 14 by suitable mechanical linkage means whereby the thermocouples 11, 12 and 13 may be raised and lowered in a thermocouple well as will be described hereinbelow. In Figure 1, the mechanical linkage means between the motor 22 and thermocouple base 14 comprise a worm 31 mounted on the motor shaft 29 and cooperating with a worm gear 32 which actuates an arm, rod or cable (represented by broken line 33) secured to the base 14.

The center or measuring thermocouple 12 is preferably mounted substantially equidistant between the end or positioning thermocouples 11 and 13 for detecting the temperature at that point. However, the three thermocouples need not be necessarily equidistant. In fact, in some special cases, if the temperature profile is not "symmetrical" near the peak, an irregular spacing of the three thermocouples may be necessary if the center couple must be placed very precisely at the peak. This center thermocouple 12 is electrically connected, through leads 34 and 35, to a temperature recorder 36 or to a recorder-controller that furnishes an electrical, hydraulic, pneumatic or mechanical output signal in response to the input voltage from the temperature indicating thermocouple 12. This output signal may be transmitted through a suitable conduit 37 to regulate a valve, motor, heater or any other means used for controlling a reaction.

Figure 2:
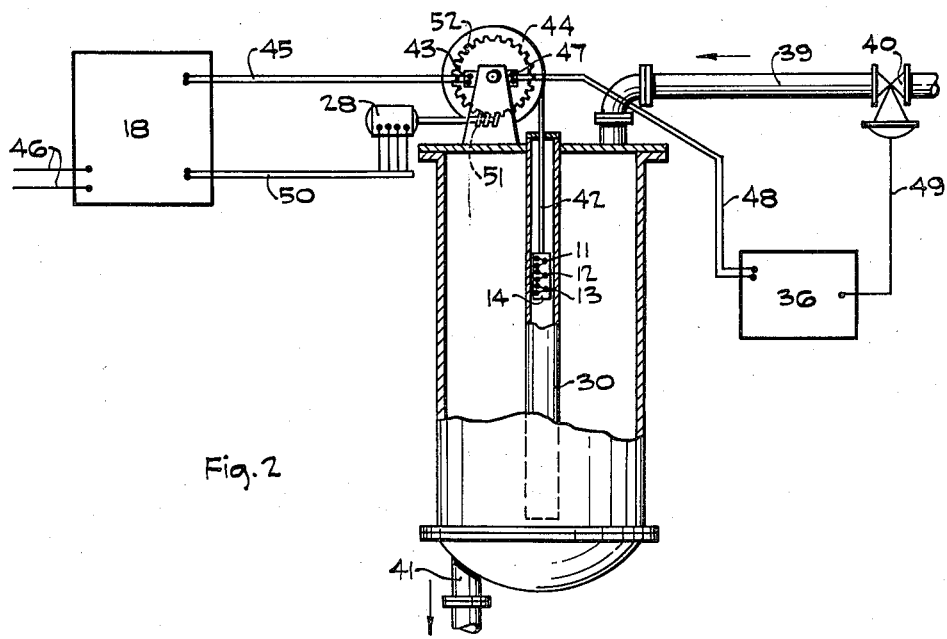
Figure 2 is a diagrammatic view of the present maximum-temperature sensing device mounted in a reaction vessel, along with related auxiliary equipment for controlling an inlet flow stream to said vessel.

In Figure 2, the present device is illustrated as being mounted on the top of a vertically-positioned cylindrical reaction vessel 38 which is closed at both ends. The vessel 38 is equipped with inlet conduit means 39, having a motor-controlled or pressure-operated valve 40 therein, and with outlet flow means 41. Positioned within the vessel 38, and extending substantially the length thereof, is a thermocouple well 30 of suitable design. Depending upon the type of reaction taking place within the vessel, the well 30 may be of fluid-tight construction in one instance, of perforate construction in another, and may be dispensed with entirely under certain circumstances.

The thermocouple block 14 is slidably mounted within the well 30 at the end of an electrical cable 42 containing leads 16, 17, 34 and 35. The electrical signal from the positioning thermocouples 11 and 13 may be transferred from the cable 42 to a terminal 43 on the outside of the drum by any suitable means, as by slip rings (not shown) mounted on the shaft of the cable drum 44. The terminal 43 is electrically connected by cable 45 to the converter and amplifier 18, which in turn receives power through leads 46. In a like manner, the voltage from the temperature-indicating thermocouple 12 is transmitted up the cable 42, through slip rings (not shown) to terminal 47 and thence to the recorder-controller 36 through cable 48. The output signal from the controller may be transmitted through conduit 49 to regulate the setting of valve 40 in the inlet line 39 to the vessel 38.

Operating current is supplied to the motor 28 through cable 50 containing leads 23—26. The motor 28 (Figure 2) is fixedly mounted adjacent the cable drum 44 and has a worm 51 mounted on its shaft 29 which engages a worm wheel 52 fixedly mounted on the drum 44 or shaft thereof. Thus, in this embodiment the thermocouples 11, 12 and 13 are raised and lowered within the thermocouple well 30 by regulating the amount of cable 42 that is unwound from the drum 44.

Figure 3:
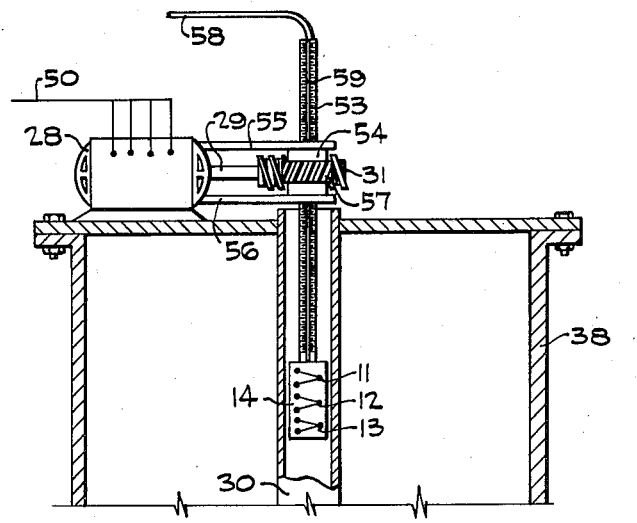
Figure 3 is another embodiment of reversible prime mover means for positoning the present temperature-sensing device within a reaction vessel. It is understood that this arrangement could be used with the reversible prime mover either above or beneath the reactor or with the reactor horizontal or at any other angle.

In another embodiment, Figure 3, the thermocouples 11, 12 and 13 may be mounted at the end of a lead screw or threaded rod 53 which is coaxially suspended (or supported from the bottom) within the thermometer well 30. The lead screw is mounted within an internally threaded collar 54 which is supported for rotatable motion above (or below) the open end of the thermocouple well 30. In this embodiment, the collar 54 is rotatably mounted between a pair of brackets or supporting arms 55 and 56 which are affixed to the casing of the motor 28. A worm wheel 57 is affixed to the outer surface of the collar 54 and is actuated by the worm 31 mounted on the shaft 29 of the motor 28. The threaded shaft 53 is preferably hollow to accommodate a cable 58 containing leads 16, 17, 34 and 35 to the thermocouples 11, 12 and 13. Preferably, the threaded shaft is provided with a longitudinal groove or keyway 59 in its outer surface, said keyway being in register with a key (not shown) in either bracket 55 or 56 thereby preventing rotational movement of the shaft 53.

Many chemical reactions are carried out in a fixed-bed catalytic unit wherein the catalyst becomes contaminated or spent after a period of operation. From time to time the catalyst is regenerated; for example, carbonaceous material adhering to the particles of catalyst may be oxidized by blowing air through the bed of catalyst.

Thus, the vessel 38 shown in Figure 2 may be packed with spent catalyst which is regenerated by introducing air into the vessel through the inlet flow line 39. The oxygen in the air oxidized the carbonaceous material from the catalyst and the spent or flue gas is discharged through the outlet flow line 41. In some cases a portion of the spent effluent gas may be recirculated and fed back into the top of the vessel through conduit 39 together with a predetermined amount of air, whereby the amount of oxygen in the influent flow stream is maintained within fixed predetermined limits, say 2 to 4 per cent. The temperature of the regeneration reaction within the vessel 38 is governed by the amount of oxygen introduced; the greater the amount of oxygen, the higher the reaction temperature. As previously stated, the maximum reaction temperature is not allowed to exceed a predetermined value in order to prevent destructive overheating of the catalyst.

The catalyst regeneration reaction is non-isothermal, that is, the reaction takes place in a relatively small zone of said vessel, in which zone the flame front or level of maximum reaction temperature is often sharply defined. The regenerated catalyst above the flame front and the spent catalyst below are at substantially lower temperatures. The operating principle of the present apparatus is based upon the fact that the maximum regeneration reaction takes place in a limited zone at high temperature flame front that continually moves downward through the bed of catalyst.

To determine the maximum temperature of the flame front, the present thermocouple housing 14 (Figure 2) is positioned at the top of the thermocouple well 30. Since the upper and lower thermocouples 11 and 13 are connected in series so as to respond to temperature differentials, an E. M. F. differential exists when one thermocouple is at a higher temperature than the other. If both the upper and lower thermocouples 11 and 13 are positioned above the shifting flame front when the regeneration starts, upon closing of the main switch 21 the motor 28 is energized to actuate the cable drum so that the thermocouples are lowered until they bracket the flame front.

With the thermocouples positioned in such a manner, the intermediate thermocouple 12 is positioned opposite or on a level with the maximum temperature of the shifting flame front. The voltage generated by this thermocouple 12 is transmitted to the recorder-controller which may be set to maintain the temperature of the flame front at a constant temperature. Thus, when the temperature increases, the output signal from the controller 36 to the control valve 40 changes the setting thereof to reduce the amount of air or oxygen entering the reaction vessel 38 through the inlet flow line 39.

As the top portion of the catalyst bed becomes regenerated the flame front moves downward through the bed. In moving downward it moves away from thermocouple 11 and toward thermocouple 13 thereby setting up an E. M. F. differential that is transmitted up cable 42 and through cable 45 to the converter-amplifier 18. The output from the converter-amplifier 18 drives the reversible motor 28 at a speed and in a direction dependent upon the magnitude and direction of the differential E. M. F. between the positioning thermocouples 11 and 13. Thus, the motor 28 rotates the drum 44 until the thermocouples 11 and 13 are again positioned substantially equidistant on either side of the flame front and are at the same temperature. It is evident that the spacing between the upper and lower thermocouples 11 and 13 is dependent upon and should be greater than the size of the shifting zone of maximum reaction temperature within the reaction vessel 38 in order to effectively bracket said zone.

If desired, the present apparatus may be provided with a manually-operated single-pole double-throw switch 60 (Figure 1) by means of which an operator may move the thermocouples 11, 12 and 13 in either direction at will by shunting out one or the other of the positioning thermocouples 11 or 13. On the closing of switch 60, the motor 28 is energized to move the thermocouple housing 14 in the direction of the thermocouple remaining in the circuit. In this manner an operator can move the thermocouples 11, 12 and 13 through the entire height of the reactor at will, at the same time observing the temperature of the measuring thermocouple 12 and placing it on or near whichever hot peak it is desired to measure or control. Thus, in the event that there is more than one peak or zone of maximum temperature within the vessel, the operator may manually operate the apparatus to place the positioning thermocouples 11 and 13 on either side of said peak. Once placed there, the switch 60 is opened and the thermocouples follow the peak automatically.

While the present apparatus has been described as being utilized to follow a shifting hot front or temperature "peak" of an exothermic reaction, it is evident that the positioning thermocouples 11 and 13 are adapted to follow and control the temperature of a shifting temperature "valley" which is present at the zone of maximum reaction in an endothermic reaction. Thus, since the optimum reaction takes place with the greatest absorption of heat, this lower temperature of the shifting reaction zone is sufficient to set up a temperature differential which would cause the movement of the positioning thermocouples.

While the reaction temperature of the endothermic reaction zone is less than that of the components added to the reaction, there is an optimum reaction temperature at which the reaction is normally carried out, since at a lower reaction temperature the components to the reaction may not react and at a higher temperature there may be a reversal of the reaction. Thus, the present apparatus may be used to follow the optimum reaction temperature of an endothermic reaction in a manner similar to that in an exothermic reaction, and by means of the recorder-controller 36 control the rate of flow of the reaction components into the vessel 38 or the temperature of the components before they enter the vessel.

It is to be noted that the one-dimensional arrangement described above may also be adapted to determine or control the hottest point in a two- or three-dimensional system. For example, it may be desirable to determine or control the temperature of the hottest point in a large vat containing a fermenting mash, or any thick, viscous material. Assuming that the mass is not agitated and that there is a definite temperature gradient in the mass, the present thermocouple carrier adapted to move in three dimensions will seek the hottest point in the mass.

Figure 4:
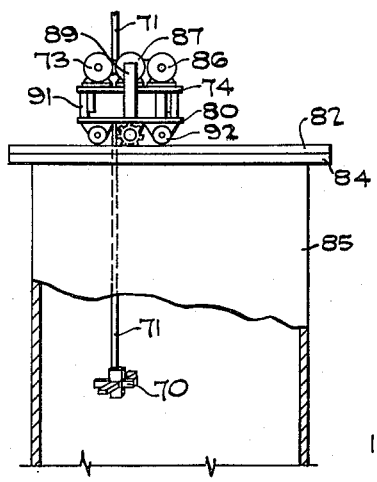
Figure 4 is another embodiment of the present maximum-temperature sensing device mounted for movement in three planes within a reaction vessel.
Figure 5:
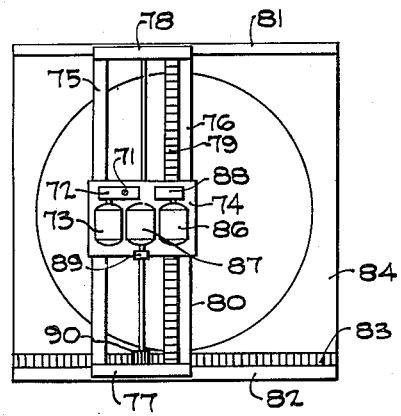
Figure 5 is a plan view of the embodiment illustrated in Figure 4.

A three-dimensional system will be briefly outlined with regard to diagrammatic Figures 4 and 5, wherein a thermocouple carrier 70 may be mounted on the lower end of a lead screw 71 which, through suitable gearing 72, is driven by a reversible motor 73 to raise and lower the carrier 70 in a manner identical with that described in regard to Figure 3.

The motor 73 is fixedly secured to a plate member 74 which is mounted for horizontal movement on a platform 80 comprising a pair of tracks 75 and 76, secured by end members 77 and 78 and a geared track 79 parallel to said tracks 75 and 76. The platform 80 in turn is mounted for horizontal movement along a pair of tracks 81 and 82 and a geared track 83, the tracks 81 and 82 being affixed at right angles to the platform tracks 75 and 76 on top of plate 84 of a reaction vessel 85.

A pair of reversible motors 86 and 87 are mounted on the plate member 74 and are suitably geared (as diagrammatically represented at 88, 89 and 90) to the geared tracks 79 and 83, respectively. Motor 86 drives the plate member 74 on wheels 91 along tracks 75 and 76, and motor 87 drives the platform 80 on wheels 92 along tracks 81 and 82.

Figures 7, 8:
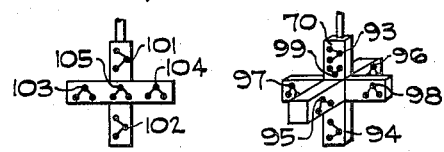

As shown in Figure 8, the thermocouple carrier 70 has seven thermocouples 93, 94, 95, 96, 97, 98 and 99 mounted thereon, six of them being arranged as at the six corners of a regular octahedron while the seventh is placed substantially at the center of the group. Each pair of thermocouples is connected to one of the reversible motors through suitable leads; thermocouples 93 and 94 being connected to motor 73, thermocouples 95 and 96 to motor 86 and thermocouples 97 and 98 to motor 87. Each motor may be connected to its pair of thermocouples in a manner similar to that described with regard to Figure 1. It may be seen that with the thermocouples mounted in the above-described manner, the thermocouple carrier 70 will continue to hunt throughout the vessel until the hot spot is bracketed. At such a time, the temperature-measuring thermocouple 99 will be positioned substantially in the center of the hot spot.

It may be readily understood that a two-dimensional temperature-sensing system may be operated by employing a thermocouple carrier 100, shown in Figure 7, having two pairs of thermocouples 101 and 102, 103 and 104 grouped around a common temperature-measuring thermocouple 105. Each pair of thermocouples would be connected in series opposition to an independent reversible motor, as previously described.

I claim as my invention:

1. A system for continously measuring the temperature of an optimum reaction region shifting within a reaction zone, comprising a carrier positioned within said zone, first electrical temperature-sensing means supported by said carrier, second temperature-sensing means arranged on said carrier on either side of said first temperature-sensing means along at least two straight lines normal to each other which intersect at said first temperature-sensing means, temperature indicating means connected to the output of said first temperature-sensing means, reversible prime-mover means, means responsive to the output of said second temperature-sensing means differentially connecting the output of said second temperature-sensing means to said prime-mover means, for causing the prime-mover means to move the temperature-sensing means toward the optimum reaction region, and actuating linkage means connected between said carrier and said prime-mover means.

2. A system for continuously measuring the temperature of an optimum reaction region shifting within a reaction zone, comprising a carrier mounted for movement within said zone, first electrical temperature-sensing means supported by said carrier, second and third electrical temperature-sensing arranged on said carrier on either side of said first temperature-sensing means along three straight lines each normal to the others which intersect at said first temperature-sensing means, temperature indicating means connected to the output of said first temperature-sensing means, a reversible electric motor, means differentially connecting the outputs of said second and third temperature-sensing means to said motor, and actuating linkage means connected between said carrier and said motor for moving said temperature-sensing means in any direction within said reaction zone, whereby said carrier is moved by said motor and said linkage means in the direction of a shift of said optimum reaction region in response to a change in the output differential from said second and third temperature-sensing means caused by said shift.

3. A system for continuously measuring the temperature of a predetermined reaction zone shifting within a reaction space, comprising a carrier positioned within said space, first thermocouple means supported by said carrier centrally thereof, three pairs of thermocouples supported by said carrier, one of the thermocouples of each pair being arranged on either side of said first thermocouple means in fixed spaced relationship therewith along a straight line, the three straight lines along which the thermocouple pairs are positioned intersecting at right angles to each other at said first thermocouple means, the spacing between each pair of thermocouples being greater than that between the boundaries of said reaction zone, temperature indicating means connected to the output of said first thermocouple means, three reversible electric motors, means responsive to the output of said pairs of thermocouples differentially connecting the outputs of said three pairs of thermocouples to said motors to energize said motors, and actuating linkage means connected between said carrier and said motors for moving said carrier in any desired direction within said space in response to a change in the output differential from any of said pairs of thermocouples caused by a shift of said predetermined reaction zone within said space.

RICHARD G. WALTON.

References Cited in the file of this patent

UNITED STATES PATENTS

| Number | Name | Date |
|---|---|---|
| 1,863,373 | Harrison | June 14, 1932 |
| 1,968,534 | Megow | July 31, 1934 |
| 2,091,303 | Brelsford | Aug. 31, 1937 |
| 2,127,529 | Prickett | Aug. 23, 1938 |